US009010823B1

(12) United States Patent
Murray

(10) Patent No.: US 9,010,823 B1
(45) Date of Patent: Apr. 21, 2015

(54) SOCKET ORGANIZER

(71) Applicant: Jack T. Murray, Leigh Acres, FL (US)

(72) Inventor: Jack T. Murray, Leigh Acres, FL (US)

( * ) Notice: Subject to any disclaimer, the term of this patent is extended or adjusted under 35 U.S.C. 154(b) by 0 days.

(21) Appl. No.: 14/215,717

(22) Filed: Mar. 17, 2014

Related U.S. Application Data

(60) Provisional application No. 61/917,682, filed on Dec. 18, 2013.

(51) Int. Cl.
*A47F 5/03* (2006.01)
*F16M 11/18* (2006.01)
*B25H 3/02* (2006.01)

(52) U.S. Cl.
CPC .................. *F16M 11/18* (2013.01); *A47F 5/03* (2013.01); *B25H 3/025* (2013.01)

(58) Field of Classification Search
CPC .......... A47F 5/03; B25H 3/003; B25H 3/025; F16M 11/18
USPC ......... 294/143, 145, 146, 159, 160, 162, 165; 211/78, 163, 164, DIG. 1; 206/350, 206/378, 459.5, 818
See application file for complete search history.

(56) References Cited

U.S. PATENT DOCUMENTS 425,215 A * 4/1890 Franklin ........................ 312/267
846,133 A * 3/1907 McIntyre ..................... 211/69.9
2,911,107 A * 11/1959 Francavillo ...................... 211/78
3,055,510 A * 9/1962 Coates .......................... 211/164
3,405,377 A * 10/1968 Pierce ........................... 335/285
4,591,817 A 5/1986 Miller
4,802,580 A 2/1989 Andersen
5,039,180 A * 8/1991 Lemons ........................ 312/267
5,080,230 A 1/1992 Winnard
5,228,582 A * 7/1993 Marshall et al. .............. 211/163
5,482,342 A * 1/1996 Kowalski et al. ............. 294/160
5,560,480 A 10/1996 Singleton
5,669,516 A 9/1997 Horn
5,725,096 A 3/1998 Winnard
6,390,298 B1 * 5/2002 Garro ............................ 206/378
6,614,337 B1 9/2003 Winnard
6,626,303 B1 9/2003 Moodie
6,808,077 B2 * 10/2004 McConnell .................. 211/70.6
8,272,628 B2 9/2012 Winnard

FOREIGN PATENT DOCUMENTS

WO 2010002109 A1 1/2010

OTHER PUBLICATIONS

Ocean View Theme Custom Door Banner (24"×60") http://www.windycitynovelties.com/194933p/ocean-view-theme-customdoorbanner.html?s_cid=FRO194933&utm_source=Froogle&utm_medium=ShopFeed&utm_term=194933&utm_campaign=Froogle Accessed Apr. 25, 2012.

* cited by examiner

*Primary Examiner* — Dean Kramer
(74) *Attorney, Agent, or Firm* — Robert C. Montgomery; Montgomery Patent & Design, LP

(57) ABSTRACT

A socket organizer includes a planar member having a plurality of recessions to receive various sized tool elements, such as sockets. A portion of the planar member is magnetized to enable the device the ability to securely, but removably, retain each socket when placed into an individual recession. The planar member is rotatingly secured to a support stand. A mechanical connection between the planar member and support stand is provided with a series of detents to enable a user to rotate the planar member to a desired position for access to a particular socket held within the device.

15 Claims, 4 Drawing Sheets

SOCKET ORGANIZER

RELATED APPLICATIONS

The present invention was first described in and claims the benefit of U.S. Provisional Application No. 61/917,682, filed Dec. 18, 2013, the entire disclosures of which are incorporated herein by reference.

FIELD OF THE INVENTION

The present invention relates to a portable apparatus adapted to store and organize tools and tool elements on a stand having a rotatingly affixed display.

BACKGROUND OF THE INVENTION

As anyone who performs a lot of mechanical work will attest, nothing beats having the proper tool for a job. The proper tool can save time, save money, produce a higher quality job, reduce damage to equipment, and provide for the increased safety of the worker. One (1) tool that is found in many lines of work is that of the ratcheting socket wrench. The ratcheting socket wrench provides for quick removal and tightening of almost every style and size of nut or bolt with the use of interchangeable sockets. However, these interchangeable sockets are easily lost and misplaced due to their small size and ability to roll. Manufacturers have responded with carrying cases to hold such sockets; however, efforts to date have been large, unwieldy, time-consuming to use, and make it generally difficult to find the desired socket size. Accordingly, there exists a need for means by which sockets used with a ratcheting wrench can be easily stored and organized in order to address the problems as described above. The development of the socket organizer fulfills this need.

The present invention is an apparatus used for storing and organizing tool elements, such as sockets used with a ratchet wrench. The apparatus includes a central hub rotatingly affixed to a stand, where the central hub is provided with a plurality of compartments, formed by dividers, along the perimeter edge of the central hub. Magnetic material is used on interior surfaces of the compartments. Tool elements of varying lengths and sizes are then inserted in a standing fashion within the compartments such that they are arranged in a radial manner. The dividers are variable, enabling adjustment of the compartment so as to hold many tool elements of different lengths and sizes, including drive connections. The magnetic material is strong enough to hold the tool elements and tools in place easily, yet allow the user to pull the socket out from the compartment without too much effort. The central hub also comprises a magnetic material to hold tools onto a surface thereof. The hub itself can be easily rotated to display tool elements of varying sizes, and is provided with a detent mechanism to control the motion of the hub.

Prior art in this field consists of organizational socket case and tool holder devices that incorporate a magnetic structure to magnetically affix the device to a magnetized surface such as a tool chest. These devices suffer from the disadvantage of requiring a magnetized surface to which the device is to be affixed to. If users cannot avail themselves of such a surface then the prior art devices become mere organizational carrying cases. Some prior art devices have various sized socket holders to retain a variety of different size and shape tool elements, but these are fixed in that each compartment is a differing fixed size from the previous compartment. The present invention enables varying the compartment sized with the use of slidably engaged dividers. Another disadvantage of the prior art devices is that they require magnetically affixing tool elements that are specific to the configuration of the device, thereby limiting a user to a dedicated tool set for which the device stores and organizes. The present invention enables magnetic affixment of a variety of different tools and tool elements. These prior art devices further suffer from the inability to easily access the various tools and tool elements affixed thereto.

It is an objective of the present invention to provide an apparatus for storing and organizing tools and tool elements on a stand having a rotating assembly rotatingly affixed thereto.

It is a further objective of the present invention to enable effective display of, and efficient access to, each tool and tool element stored in and on the apparatus.

It is a further objective of the present invention to exploit the magnetic properties of tools and tool elements to magnetically affix them to the apparatus.

It is a further objective of the present invention to provide a portable apparatus for storing and organizing tools and tool elements without detracting from the utility provided by a stand-alone organizing apparatus.

It is a further objective of the present invention to provide a handle for ease of transport, the configuration of which will not detract form the functionality of the apparatus.

It is a further objective of the present invention to enable varying the compartment sizes into which the tool elements are retained.

It is a further objective of the present invention to provide a means to denote the type and size of tool for each compartment, which can be done permanently or temporarily.

It is a further objective of the present invention to enable temporary magnetic affixment of various tools to a surface of the apparatus.

It is a further objective of the present invention to provide a means to mechanically retain the rotating assembly in a desired position.

SUMMARY OF THE INVENTION

The present invention is an apparatus that provides a means for storing, organizing, and displaying tool elements, such as sockets. The apparatus includes a stand rotatingly engaged with a rotary assembly portion having a plurality of compartments for storing the tool elements. Each compartment incorporates magnetized portions to retain the tool elements while the rotary assembly is turned. The stand is configured to enable temporary or semi-permanent attachment of the apparatus to a flat surface, such as a workbench. The rotating assembly is configured to rotate within a range between zero degrees (0°) to at least three-hundred-sixty degrees (360°+). The rotating assembly stores each tool element in a compartment disposed about its perimeter edge so that each tool element may be accessed through an opening located on each compartment. Each compartment has a magnetic inner surface to retain each tool element placed therein.

Alternative embodiments of the present invention include a handle disposed on a top of the stand for ease of transport. Further embodiments enable variable sized compartments with use of divider portions slidingly engageable with the rotating assembly, where each divider preferably comprises a magnetic material. Further embodiments provide for indicia labeling, which may include adhesive-backed labels, molded relief-type characters, etc. Further embodiments have a magnetic member as part of the front panel of the rotating assembly to enable temporary magnetic attachment of other small tools to the face of the apparatus. Further embodiments include a plurality of detents and a ball plunger to index and mechanically retain the rotating assembly at desired positions.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY

Figure 1:
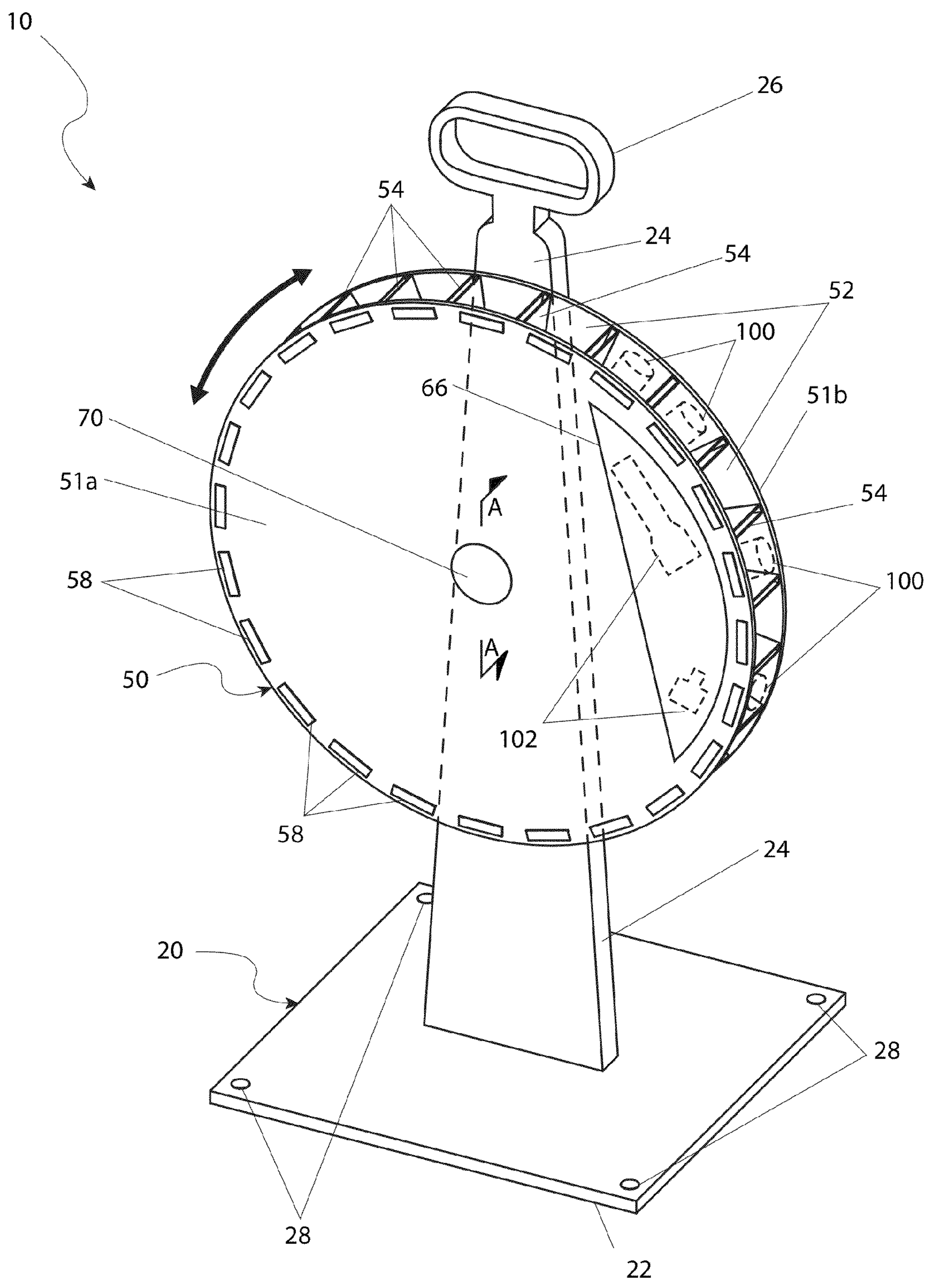
FIG. 1 is a front perspective view of a tool element organizer 10, according to a preferred embodiment of the present invention.

10 tool element organizer
20 stand assembly
22 base plate
24 back plate
26 handle
28 mounting aperture
50 rotary assembly
51*a* front panel
51*b* rear panel
52 compartment
53 first magnet
54 divider
56 slot
58 indicia
60 floor panel
62 hub
64 second magnet
66 third magnet
70 shaft
71 first flange feature
73 bushing
74 second flange feature
75 detent
77 ball plunger
78 threaded aperture
100 tool element

DETAILED DESCRIPTION OF THE PREFERRED EMBODIMENT

In accordance with the invention, the best mode is presented in terms of a preferred embodiment, herein depicted within FIGS. 1 through 4. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

The present invention describes a tool element organizer (herein described as the "apparatus") 10, which provides a means for storing and organizing tool elements 100, particularly sockets, as used with a ratchet wrench. The apparatus 10 includes a ROLODEX®-style construction providing a rotary assembly portion 50 which further includes a plurality of compartments 52 for storing the tool elements 100. Each compartment 52 is made using magnetic portions to retain the tool elements 100 while the rotary assembly 50 is turned.

Referring now to FIG. 1, a front perspective view of the apparatus 10, according to a preferred embodiment of the present invention, is disclosed. The apparatus 10 includes a stand assembly 20 and a rotating assembly 50 which is designed to store and magnetically retain a plurality of existing tool elements 100.

The stand assembly 20 provides for temporary placement upon, or semi-permanent attachment to, a flat surface such as a work bench, shelf, or the like. The stand assembly 20 provides a unitary structure including a horizontal base plate 22 having an upwardly protruding vertical back plate 24, and an integral oval-shaped handle 26 which is located at a top portion of the back plate 24. The handle 26 provides a center opening portion being sized and shaped to allow insertion and grasping using a plurality of the user's fingers. The stand assembly 20 is envisioned to be made using durable plastic and metal materials.

The base plate 22 is to have substantial size and weight to stabilize the apparatus 10 against tipping during use. Additionally, the base plate 22 provides a plurality of mounting apertures 28, preferably positioned at corner locations, allowing a user to secure the apparatus 10 in a semi-permanent manner to a flat surface using fasteners, if so desired. The back plate portion 24 provides rotating attachment at an intermediate location to the rotary assembly 50 via rotating hub 62 and shaft 70 portions (see FIG. 4). The handle 26 is envisioned to provide an oval-shaped aperture or similar ergonomic means of grasping and lifting to transport the apparatus 10.

The rotary assembly 50 allows a user to access existing tool elements 100 contained within a plurality of compartment portions 52 positioned all along a perimeter edge. The tool elements 100 may be accessed through open top portions of each compartment 52. Each compartment 52 provides magnetic inner surfaces to retain the tool elements 100 within while rotating the rotating assembly 50, which may be rotated within a range between zero degrees (0°) to at least three-hundred-sixty degrees (360°+). The rotary assembly 50 includes circular front panel 51*a* and rear panel 51*b* portions being positioned vertically and parallel to each other, and each panel 51*a*, 51*b* having similar diameters. The sides of the compartments 52 are formed by inner-facing surfaces of the front 51*a* and rear 51*b* panels, a bottom surface comprising a floor panel 60 (see FIG. 3), and selectively positioned removable dividers 54. The tool elements 100 are retained within the compartments 52 via a plurality of magnets 53, 54, 64 (see FIGS. 2 and 3).

The rotating assembly 50 is envisioned to utilize a plurality of indicia 58 upon an outer surface portion of the front panel 51*a*, located adjacent to each compartment 52, to provide identification of the contents. The indicia 58 may include adhesive-backed paper labels, molded-in relief-type characters, pre-printed symbols, or the like, which allow a user to identify and/or write upon to describe the contents.

Figure 2:
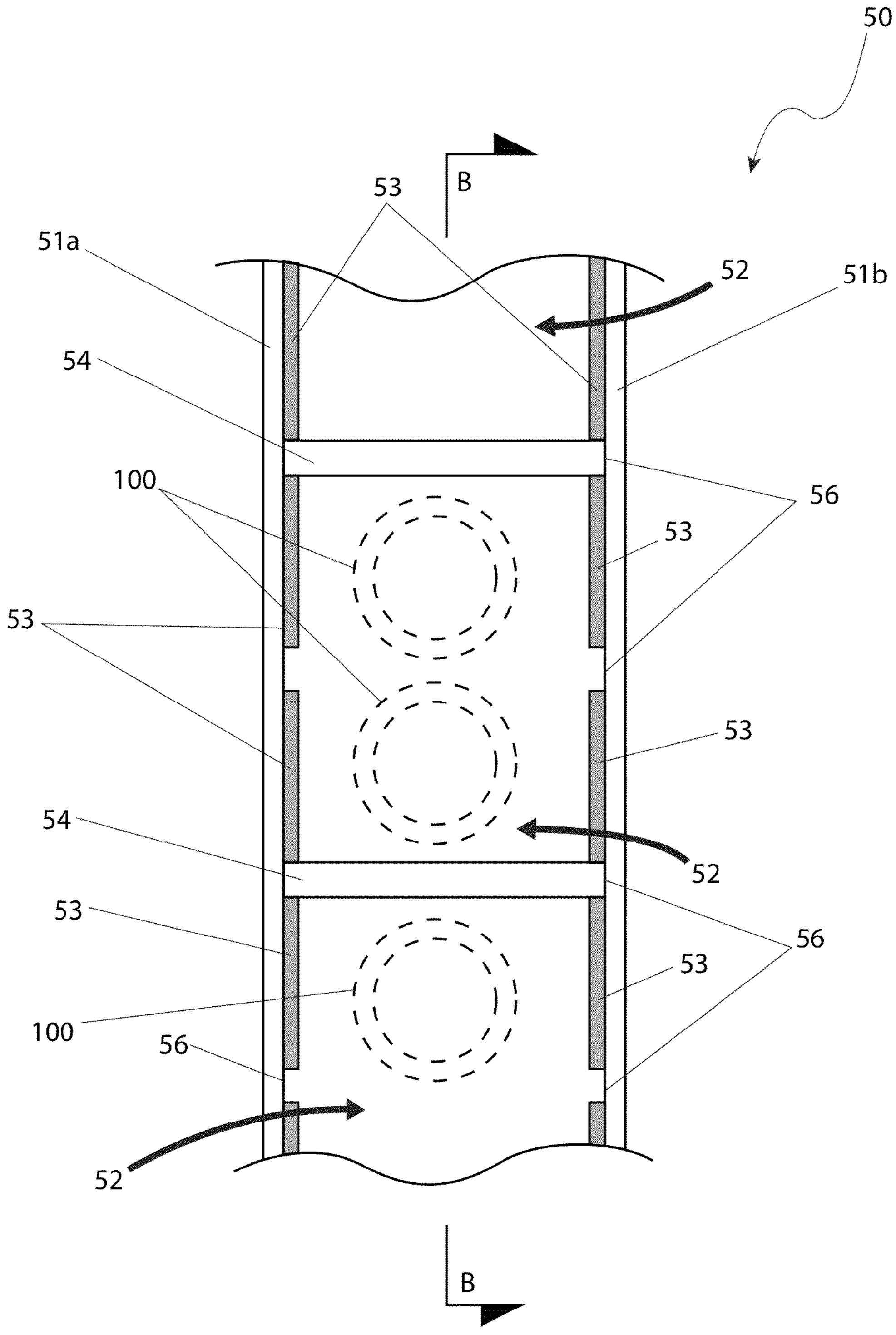
FIG. 2 is a top view of a rotary assembly portion 50 of the tool element organizer 10, according to a preferred embodiment of the present invention.
Figure 3:
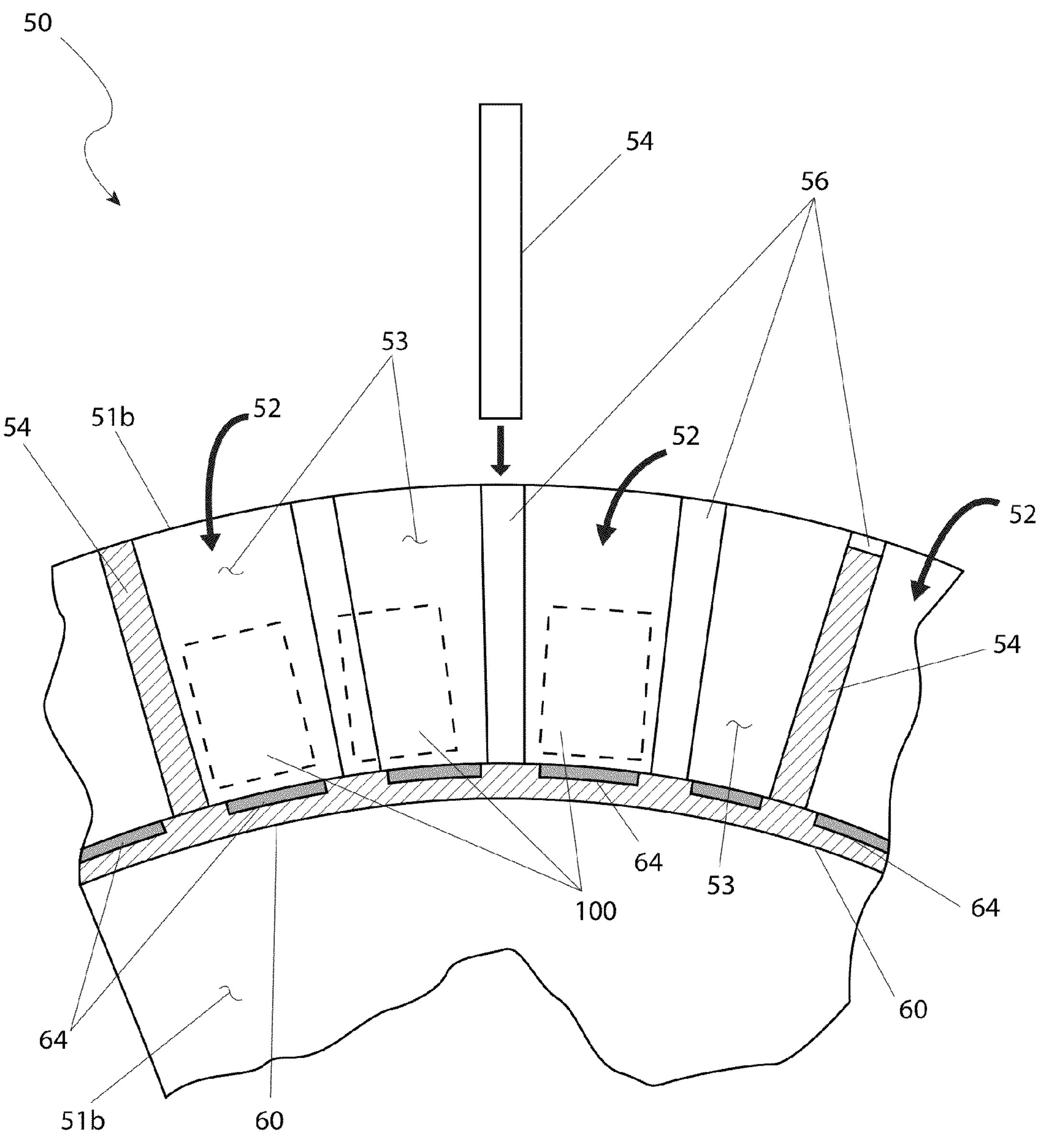
FIG. 3 is a sectional view of the rotary assembly 50 taken along section line B-B (see FIG. 2), according to a preferred embodiment of the present invention; and, FIG. 4 is a sectional view of a shaft portion 70 of the tool element organizer 10 taken along section line A-A (see FIG. 1), according to a preferred embodiment of the present invention.

Referring now to FIGS. 2 and 3, top and sectional views of the rotary assembly portion 50 of the apparatus 10, according to a preferred embodiment of the present invention, are disclosed. The rotating assembly 50 provides a plurality of compartments 52 along a perimeter edge portion. Each compartment 52 is envisioned to be rectangular in shape and may be selectively sized via variably positioned divider portions 54. The side surfaces of the compartments 52 are formed by the front 51*a* and rear 51*b* panels, further comprising a plurality of equally-spaced and adhesively bonded first magnets 53. The first magnets 53 are generally rectangular in shape and separated from each other by parallel linear slots 56. The slots 56 are arranged perpendicular to the perimeter edge of the panels 51*a*, 51*b* and having a width so as to allow sliding insertion of the dividers 54 therein at desired locations. The selective insertion of the dividers 54 within the slots 56 allows a user to create a compartment 52 having a desired length for storing a particular number of tool elements 100 or other related items.

As previously described, the front 51*a* and rear 51*b* panels are partially covered by the first magnet portions 53. The first magnets 53 are envisioned to be sections of polymer magnet sheet material or an equivalent magnetic material. In a similar manner, the floor panel 60 is to include a plurality of adhesively bonded second magnets 64 made using a similar material as the first magnets 53. Finally, the dividers 54 are envisioned being made of a permanent magnet material or may be made using a plastic base material having adhesively bonded sections of polymer magnetic sheet, in a similar manner as the aforementioned first panel 51*a*, second panel 51*b*, and floor panel 60 portions.

Drive tool elements 100 of varying lengths and sizes are envisioned to be inserted into the compartments 52 in a standing fashion to conserve space. The apparatus 10 is capable of holding many tool elements of different lengths, different sizes, and different drive connection sizes such as one-eighth (⅛), one-quarter (¼), one-half (½), and three-quarters (¾) inch. However, it is also envisioned that the apparatus 10 could be introduced in several models which each correspond to a particular drive connection, and as such should not be interpreted as a limiting factor of the apparatus 10. The front 51*a* is envisioned to provide at least one (1) large third magnet 66 along an outer surface for temporary magnetic attachment of other small tools such as drive extensions, drive adapters, wrenches, screwdrivers, and the like. The third magnet 66 is envisioned to be made of a similar bonded polymer magnetic material as the first 53 and second 64 magnets.

The previously described magnetic portions 53, 54, 63 within the compartments 52 are to apply enough magnetic force to hold the tool elements 100 in place, but allow the user to remove a tool element 100 with reasonable effort.

Figure 4:
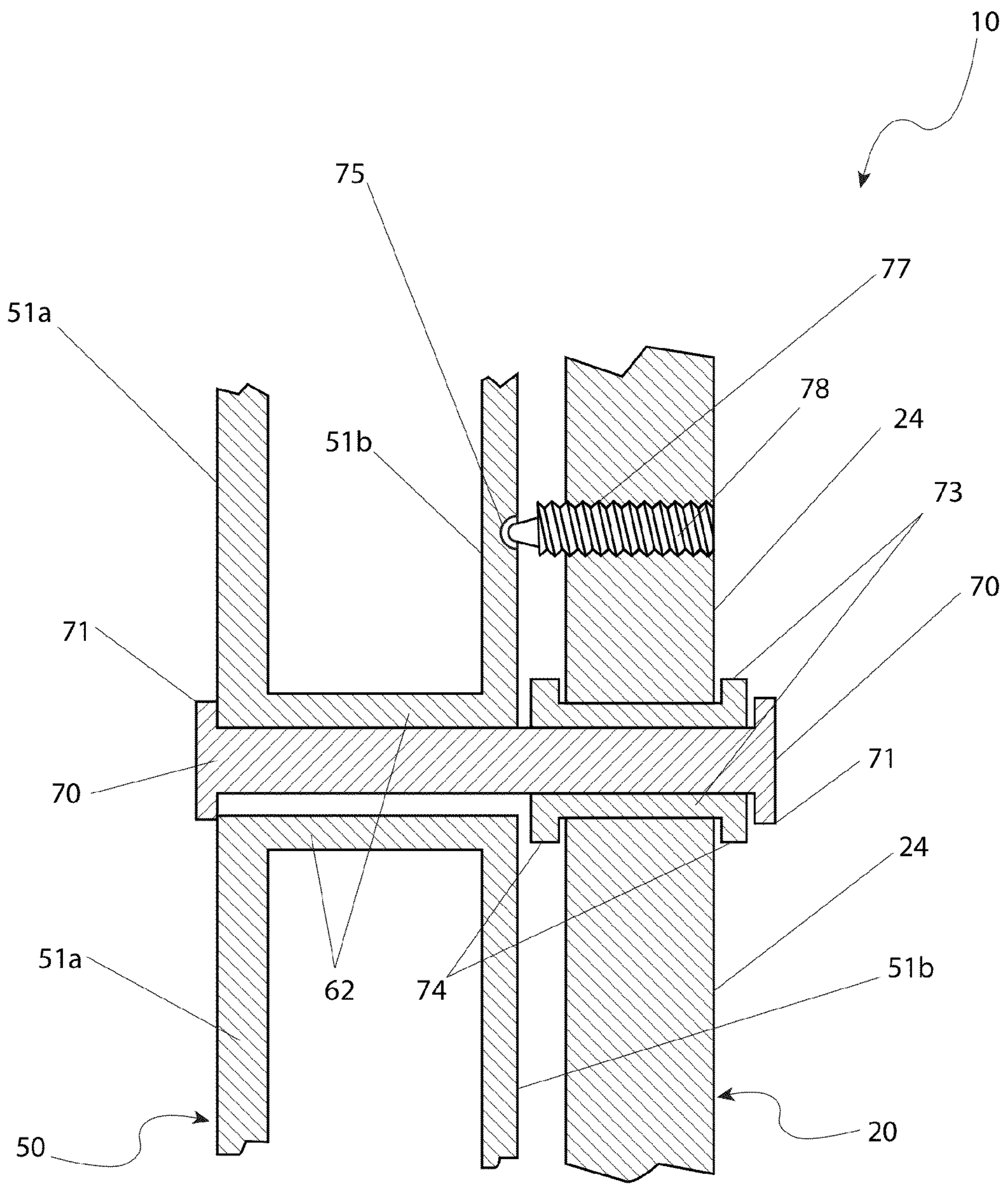

Referring now to FIG. 4, a sectional view of a rotating shaft portion 70 of the apparatus 10 taken along section line A-A (see FIG. 1), according to a preferred embodiment of the present invention, is disclosed. The front panel 51*a* and rear panel 51*b* portions are connected to each other along a center line by an integral cylindrical hub portion 62. The hub 62 provides a means to attach the rotating assembly 50 to the back plate portion 24 of the stand assembly 20. The hub 62 comprises a hollow cylindrical form that provides securement of a front end of a shaft 70, which has a rearwardly extending rear end portion that passes through a bushing 73 via a slip-fit. The bushing 73 is permanently mounted within the back plate 24 providing a means to rotate the rotating assembly 50 and shaft 70 portions. It is envisioned that the shaft 70 includes integral retaining first flange features 71 which extend perpendicularly from each end portion. The bushing 73 is envisioned to be a self-lubricating bronze bushing or equivalent bearing component, and is secured to the back plate 24 via integral second flange features 74 that extend perpendicularly at each end portion.

The apparatus 10 further provides a means to index and mechanically retain the rotating assembly 50 at a desired position via a plurality of detents 75 and a ball plunger 77. The detents 75 provide a plurality of equally-spaced circular impressions arranged in a circular pattern being molded-in or machined into a rearward surface of the rear panel 51*b*. The detents 75 work in conjunction with the ball plunger 77, which is threadingly installed within the back plate 22 at a corresponding location so as to align with the circular pattern of the detents 75, thereby allowing engagement between the detents 75 and ball plunger 77 to retain a position of the rotating assembly 50. The spring-loaded nature of the ball plunger 77 allows a user to motion the rotating assembly 50 from one (1) detent 75 to another with minimal force being applied.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of preparing the apparatus 10 for use may be achieved by performing the following steps: procuring a model of the apparatus 10 being suitable for storing tool elements 100 of an intended number of tool elements 100, or a particular drive size; mounting the apparatus 10 to a flat surface such as a work bench or shelf, if so desired, using the mounting aperture portions 28 in the base plate 22 and fasteners, or; utilizing the handle 26 to grasp and transport the apparatus 10 to a job site, as needed; loading the apparatus 10 with existing tool elements 100 by rotating the rotating assembly 50 until a particular compartment 52 is positioned near a top position of the rotating assembly 50, being retained in position by engagement of the ball plunger 77 and detent 75 portions; inserting dividers 54 in a selective manner within slot portions 56 to obtain a compartment 52 having a desired length; loading the compartment 52 with tool elements 100, other small tools, and miscellaneous items, as desired; rotating the rotating assembly 50 to another loading position until the ball plunger 77 and detent 75 engage; repeating the insertion of dividers 54, loading of tool elements 100, and the rotating process for a desired number of compartments 52; applying indicia 58, if utilizing label-type indicia 58, along the front panel 51*a* adjacent to each loaded compartment 52 to identify the corresponding contents; and, affixing desired drive accessories 102 and various small tools such as drive extensions, drive adapters, wrenches, screwdrivers, and the like, to the large third magnet 66 located upon the front panel 51*a*. The apparatus 10 is now ready for use.

The method of utilizing the apparatus 10 may be achieved by performing the following steps: locating and obtaining a desired tool element 100 stored within the apparatus 10 by rotating the rotating assembly 50 until positioning a compartment 52 containing the desired tool element 100 at a top position; securing the rotating assembly 50 via engagement of the ball plunger 77 within a detent 75; extracting the desired tool element 100; detaching other drive accessories 102 from the third magnet 66, as needed; and, utilizing the apparatus 10 to acquire tool elements 100 and drive accessories 102 to complete a task in a timely manner.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. An organizer, comprising:
a stand assembly, comprising:
a vertical back plate having a bottom and a top;
a horizontal base disposed on said bottom; and,
a bushing disposed within said vertical back plate;
a rotary assembly, comprising:
a front panel affixed to a rear panel forming a perimeter edge; and,
a plurality of compartments disposed on said perimeter edge;
wherein each compartment is configured to receive at least one ancillary tool element through an opening of said compartment; and,
wherein each compartment is provided with a magnetic portion to removably store and retain said ancillary tool element;
a rotating attachment, comprising:
a shaft, having a front end and a rear end; and,
a rotating hub to secure said front end to said rotary assembly;
wherein said rear end passes through said bushing; and,
wherein said rotary assembly rotates about said rotating attachment; and,
wherein said stand assembly is configured to support said organizer in an upright position and permit rotary motion of said rotary assembly about said rotating attachment.

2. The organizer recited in claim 1, wherein said horizontal base is provided with a plurality of mounting apertures.

3. The organizer recited in claim 1, further comprising a handle disposed on said top.

4. The organizer recited in claim 3, wherein said handle is substantially oval in shape.

5. The organizer recited in claim 3, wherein said handle is configured to permit insertion of a plurality of human fingers.

6. The organizer recited in claim 1, wherein at least one of said front and rear panels are circular.

7. An organizer, comprising:
a stand assembly, comprising:
a vertical back plate having a bottom and a top;
a horizontal base disposed on said bottom; and,
a bushing disposed within said vertical back plate;
a rotary assembly, comprising:
a front panel affixed to a rear panel forming a perimeter edge having a floor panel with conjoined sides;
a plurality of slots intermittently disposed within said sides, wherein diametrically opposed slots form a pair of slots; and,
at least one divider configured to slidably engage a pair of slots;
wherein magnetic material is disposed on at least one surface of said floor panel and said sides;
wherein a compartment is formed within a space defined by said floor panel, said sides, and said divider for each divider inserted into said pair of slots;
wherein each compartment is configured to receive at least one ancillary tool element; and,
wherein said magnetic material enables removable storage and retention of said ancillary tool element;
a rotating attachment, comprising:
a shaft, having a front end and a rear end; and,
a rotating hub to secure said front end to said rotating rotary assembly;
wherein said rear end passes through said bushing; and,
wherein said rotary assembly rotates about said rotating attachment;
a mechanical indexing mechanism, comprising:
a plurality of detents disposed on said rear panel; and,
a ball plunger disposed on said back plate;
wherein said ball plunger is configured to mechanically engage a detent to temporarily retain said rotary assembly in a fixed position as said rotary assembly is rotated about said rotating attachment; and,
wherein said stand assembly is configured to support said organizer in an upright position and permit rotary motion of said rotary assembly about said rotating attachment.

8. The organizer recited in claim 7, wherein said horizontal base is provided with a plurality of mounting apertures.

9. The organizer recited in claim 7, further comprising a handle disposed on said top.

10. The organizer recited in claim 9, wherein said handle is substantially oval in shape.

11. The organizer recited in claim 9, wherein said handle is configured to permit insertion of a plurality of human fingers.

12. The organizer recited in claim 7, wherein at least one of said front and rear panels are circular.

13. The organizer recited in claim 7, further comprising indicia disposed on said front panel.

14. The organizer recited in claim 7, wherein each divider comprises a magnetic material.

15. The organizer recited in claim 7, wherein said rotary assembly is provided with a magnet disposed on said front panel.

* * * * *